Nov. 10, 1964 R. E. CUMMINS 3,156,906

TRANSDUCER POSITIONING MECHANISM IN A RANDOM ACCESS MEMORY SYSTEM

Filed Oct. 16, 1959 2 Sheets-Sheet 1

Richard E. Cummins,

*INVENTOR.*

*BY.*

Fraser and Bogucki

*ATTORNEYS*

Richard E. Cummins,
INVENTOR.
BY.
[signature]
ATTORNEYS

United States Patent Office 3,156,906

Patented Nov. 10, 1964

3,156,906

TRANSDUCER POSITIONING MECHANISM IN A RANDOM ACCESS MEMORY SYSTEM

Richard E. Cummins, Saratoga, Calif., assignor to International Business Machines Corporation, New York, N.Y., a corporation of New York Filed Oct. 16, 1959, Ser. No. 846,989
5 Claims. (Cl. 340—174.1)

This invention relates to data storage systems, and more particularly to a new and improved system for precisely locating transducers at selected addresses in a random access memory.

Many digital data processing systems require the storage of a relatively large quantity of information in a memory or data storage unit occupying a relatively small volume. Such a memory or storage may comprise a recording surface which is moved cyclically with data being transferred to and from the surface by transducers which are moved to selected locations. The recording surface may comprise a magnetic disc, for example, and a plurality of discs may be mounted for rotation on a common shaft. For access to selected locations on the discs, transducers are mounted on arms which are interleaved between the discs so as to seek selected radial addresses with respect to one or more of the discs. Because of the speed with which a specific address may be located, all addresses are available without appreciable delay time so that the unit may be termed a random access memory.

Although memories which use magnetic discs and transducers provide an extremely high information storage capacity in a relatively small volume, the capacity is, however, dependent upon the radial density of the tracks recorded upon the discs, as well as the size of the discs and the relative spacing of the discs. Various positioning mechanisms have been employed in efforts to "pack" the tracks very closely in the radial direction, and in order to provide satisfactory combinations of speed and precision in the access control mechanism, both coarse and fine positioning devices have been employed. The coarse positioning device is used to locate the general area desired, and the fine positioning mechanism is used to make minute position adjustments.

While combinations of coarse and fine positioning mechanisms are satisfactory for many circumstances, it would be preferable to be able to use a single control instead of the separate circuits and mechanisms needed for both coarse and fine positioning. Precision cannot be sacrificed, however, and it is important that the system be free of operating difficulties. Thus, the system should not be subject to drift or inaccuracies due to wear or operating variables. Positioning accuracy should be the same even though discs are replaced or interchanged, and the radial packing density must be maintained at a high level.

Accordingly, an object of this invention is to provide an improved random access memory system having a simplified transducer positioning mechanism.

It is another object of this invention to provide an economical improved recording mechanism, for rapidly positioning transducers at precise address positions relative to a cyclic random access memory.

It is a further object of this invention to provide an accurate, fast and reliable mechanism for positioning transducers at selected addresses in a random access memory utilizing at least one rotating magnetic disc.

It is another object of the present invention to provide an improved servo controlled access system for locating transducers at specific tracks relative to a rotating magnetizable storage surface.

It is a further object of the present invention to provide an improved access system for a random access memory which precisely positions transducers with a single address and positioning arrangement.

These and other desirable objects may be achieved by the use of an arrangement in accordance with the present invention which generates a new erasable reference track for each desired address. A mechanism which operates to follow the reference track then positions data transducers at related addresses in the random access memory.

In one particular form of the invention, one surface of a number of magnetic discs may be utilized as a reference surface. A number of transducers disposed radially across the path of the reference surface are threaded by a central conductor to which are coupled auxiliary or branching conductors interposed between successive adjacent pairs of the transducers. For a selected address a signal is provided to only one of the branching conductors, causing current flow in opposite directions through the transducers on opposite sides of the energized branching conductor. The transducers are thus energized to provide circumferential zones of opposite magnetization on the reference surface which are divided by a very narrow transition zone which constitutes a reference track. A servo controlled reference track follower mechanism includes a transducer positioned adjacent the reference surface and movable radially with respect to it. The servo system transducer generates a signal dependent upon its position with respect to the zones of magnetization, and the servo system operates to position the transducer centrally with respect to the reference line. Each differently located reference line corresponds to a different address on the data recording surfaces of the random access memory. A number of data transducers, each of which is associated with a different portion of the data recording surfaces, are mechanically ganged to the servo transducer and move with it to the selected addresses.

A better understanding of the invention may be had from a reading of the following detailed description and an inspection of the drawings, in which like reference numerals refer to like parts, and in which.

Figure 1:
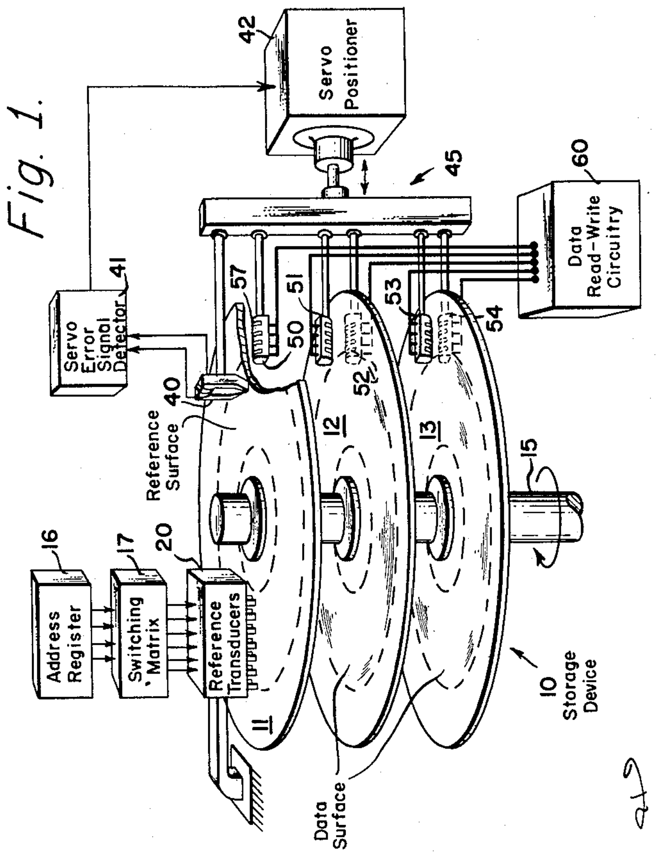
FIG. 1 is a diagrammatic representation of one arrangement of a random access memory in accordance with the invention.

A data storage system in accordance with the invention, referring now to FIG. 1, is illustrative of the general class of random access memories in which data is stored on a moving recording surface to which access is gained by movable transducers. To provide high capacity in a small volume, the storage device 10 preferably consists of a number of parallel discs 11, 12 and 13 mounted on a common shaft 15. The shaft 15 is rotated at an extremely high rate of speed by a motor or other external drive source (not shown). Although only three discs 11, 12 and 13 are shown for simplicity, many more discs would generally be employed, so that a large surface for recording and reproducing information is provided.

In the present example, the top and bottom planar surfaces of each of the discs 11, 12 and 13 (taking the position seen in FIG. 1 as a reference) are both magnetizable surfaces suitable for recording and reproducing position reference or data patterns. The top surface of the top disc 11 is in this instance used to provide a reference surface, with the bottom surface of the top disc 11 and each of the surfaces of the remaining discs 12 and 13 providing what may be termed data surfaces or data recording surfaces. Although position reference patterns are recorded on the reference surface in the form of zones of different magnetization, the recording on the data surfaces may be in the form of digital recording tracks.

Specific addresses in the storage device 10 are selected through the use of electrical signals and a fixed transducer arrangement. To generate the address information, an address register 16 which is controlled by an associated data processing system or control system (not shown) is coupled to provide digital address information to a switching matrix 17. In response to signals from the register 16, the switching matrix 17 energizes one of a number of output lines. In one sense, therefore, the switching matrix 17 is a converter which converts a parallel code to a one-out-of-a-number code. Output signals from the switching matrix 17 control the operation of a reference transducer unit 20 which is disposed in fixed space relation relative to the reference surface of the top magnetic disc 11. The reference transducers in the unit 20 function to provide a particular recording pattern on the reference surface, and may best be seen in the detailed views of FIGS. 2 and 3.

Figures 2, 3, 5, 6:
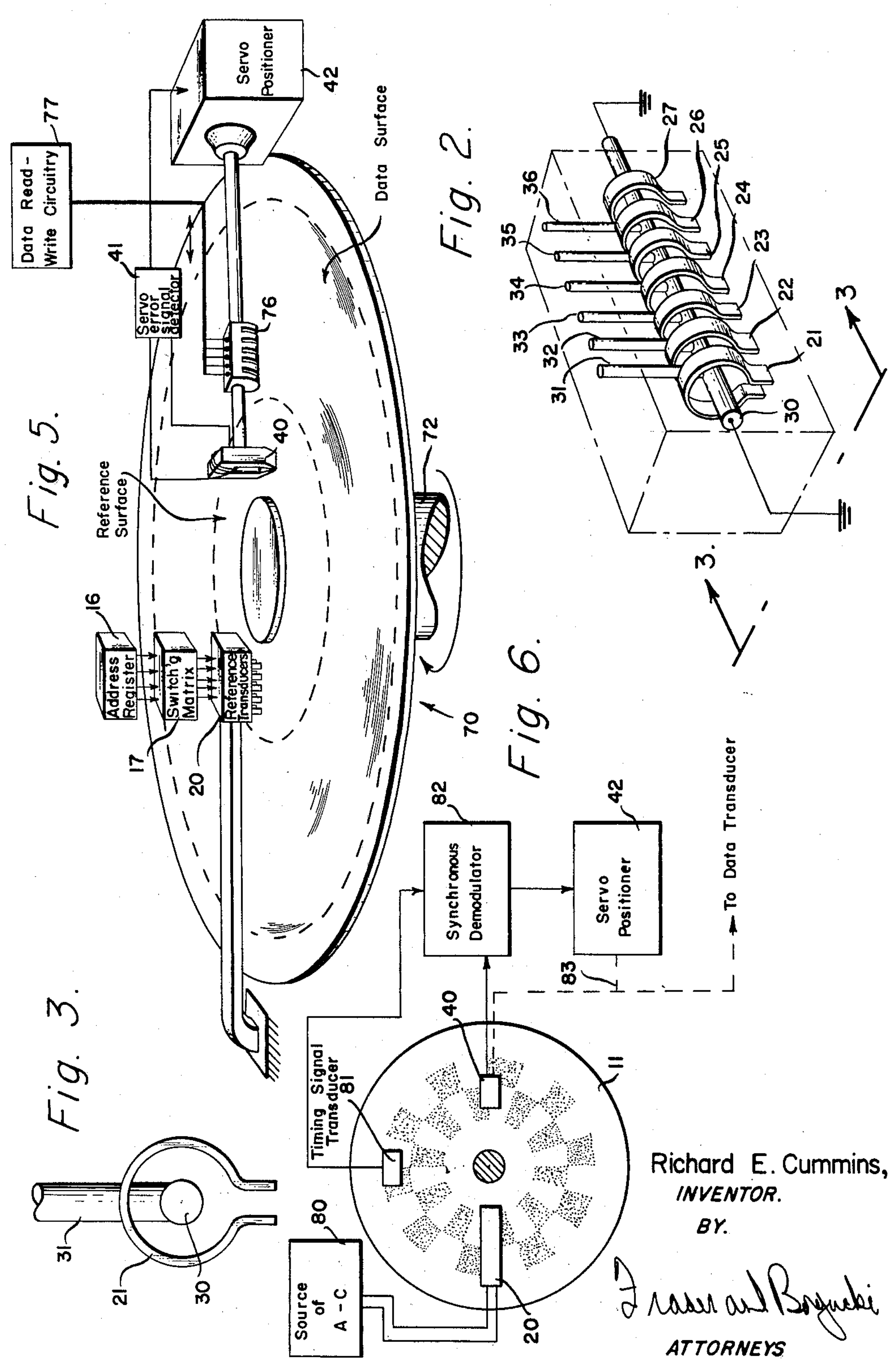
FIG. 2 is a simplified perspective view of an arrangement for recording a reference track in the system of FIG. 1.
FIG. 3 is an end view of the arrangement of FIG. 2 taken along line 3—3 in FIG. 2 looking in the direction of the appended arrows.
FIG. 5 is a simplified perspective view of an alternative arrangement in accordance with the invention.
FIG. 6 is a diagrammatic illustration of another alternative arrangement in accordance with the invention.

Briefly referring to FIGS. 2 and 3, it may be seen that the reference transducer unit 20 consists of a number of magnetic recording heads 21–27 of a particular configuration. Each of the heads comprises a body of generally annular form which is open at one point along its circumference with a pair of parallel pole pieces extending outwardly from the ends defining the open portion of the annulus toward the associated recording surface (not seen in FIGS. 2 and 3). Each pair of pole pieces of the magnetic heads 21–27 thus defines an air gap to enable the reference recording surface to be locally magnetized in a selected direction.

The magnetic recording heads 21–27 in the reference transducer unit 20 are disposed along a radius of the disc 11 (FIG. 1) so as to extend across the path of the reference surface. The radial dimension of the pole pieces of the heads 21–27 is selected relative to the spacing between individual heads such that when adjacent heads are magnetized in a like direction the area of the reference surface which passes between the adjacent heads is magnetized similarly to the areas which pass directly underneath the heads. To support the heads 21–27 in position, the heads may be fixed, along with their associated energizing circuits, in a plastic sheath or other non-magnetic structure.

In the arrangement of FIG. 1, there is employed circuitry responsive to the switching matrix 17 of FIG. 1 which operates to induce magnetization of opposite senses in the heads 21–27 on opposite sides of an intermediate dividing line. Referring to FIGS. 2 and 3, the circuitry may include a central conductor 30 which radially threads the annular body portion of each of the heads 21–27. The central conductor 30 may be coupled to ground or some other common connection at each end.

The circuits for selectively actuating the heads 21–27 include a number of individual auxiliary conductors 31–36 each interposed between a different adjacent pair of the magnetic heads 21–27. Thus, in FIG. 1 the heads 21 and 22 are adjacent the outer circumference of the magnetic disc, and there is an intermediate auxiliary conductor 31 coupled to the central conductor 30. Each of the auxiliary conductors 31–36 is coupled to and energized by a different output from the switching matrix 17. In the operation of the switching matrix 17, only one of the auxiliary conductors 31–36 is energized. Thus, only one auxiliary conductor receives a signal of a selected polarity, and only the selected auxiliary conductor is in a closed circuit path to ground.

When one of the auxiliary conductors 31–36 is energized, the current flow divides at the central conductor 30 and flows in opposite directions to the different ends of the central conductor 30. Magnetizations of opposite direction are therefore induced in the magnetic heads on the opposite sides of the separation line defined by the selected auxiliary conductor. Thus, by selecting different ones of the auxiliary conductors 31–36 for completion of a closed circuit, the associated magnetic heads 21–27 are selectively divided into inner and outer radial groupings which are differently energized. The effect of this operation is to cause the magnetization of the reference surface to take the form of two radially distinct zones of opposite magnetization. The transition region between the adjacent boundaries of the zones of opposite magnetization defines a relatively narrow circumferential reference track in the reference surface on the top of the top magnetic disc 11.

While only seven reference heads 21–27 have been shown for simplicity, many more would ordinarily be used to provide a sufficient number of address selections. It will also be recognized that, depending upon whether erasure or other associated equipment is used, the reference track may be defined in various other ways. Not all the reference transducers need be energized, for example. Thus, with other systems the transducer unit 20 might be controlled in accordance with the teachings of United States Patent No. 2,835,743 Muffley, to which reference may also be made for a detailed explanation of the operation and construction of units of this type.

With the above described system for establishing a reference track on the reference surface, there is employed a servo controlled positioning device. Referring again to FIG. 1, a positioning device is shown which includes a servo transducer 40 which is magnetically coupled to the reference surface of the top disc 11. The servo transducer 40 is radially movable with respect to the reference surface, in a manner which is described in more detail below, and provides output signals to a servo error signal detector 41. The servo error signal detector 41 generates an error signal in response to the sense and (within certain limits) the amount of deviation of the servo transducer 40 from the reference track. The error signal is applied to a servo positioner 42 which controls an arm assembly 45 which mechanically supports and gangs together the servo transducer 40 and the data transducers (to be described below). The term "servo positioner" is intended to connote the remainder of a closed loop servo system which responds to the error signals by moving the servo transducer 40 in a direction which tends to minimize the error signal, and thus to follow the reference track. The servo system is designed in accordance with known considerations to follow the reference track on the reference surface with the precision desired for the particular application. In order to achieve the close radial packing of the data tracks, the servo loop should function to maintain the servo transducer at the reference track with an accuracy of the order of 1/1000".

One particular type of transducer which may be employed as the servo transducer 40 to follow a reference track between two oppositely magnetized regions is that which is shown and described in United States Patent No. 2,700,703 issued January 25, 1955 in the name of H. W. Nordyke, Jr. A number of conventional data transducers or data transfer heads are mechanically coupled to the servo transducer 40 and are grouped in separate units 50–54, each of which is associated with a different data recording surface on one of the magnetic discs 11, 12 or 13. Thus, the first data transducer unit 50 is disposed adjacent the bottom side of the top magnetic disc 11, the next two data transducer units 51 and 52 are operatively associated with the top and bottom surfaces respectively of the intermediate magnetic disc 12, and the remaining two units 53 and 54 are associated with the top and bottom surfaces respectively of the lower magnetic disc 13.

While each of the units 50–54 may have any number of magnetic heads, four heads are shown for each unit in FIG. 1. Thus, four heads 57 are shown disposed with the uppermost data transducer unit 50 and likewise four heads 58 are employed in the next succeeding transducer unit 51. Each group of heads, such as the heads 57 or 58, are disposed along a radius of the associated reference surface, and the individual heads are located at selected radial spacings from each other. The particular arrangement shown for the individual heads is merely illustrative of one combination which may be employed. The number of heads used in association with any particular data surface may vary from one to a considerable number. For seven channel recording, for example, seven data recording surfaces might be used and a different data head positioned adjacent each one of the different recording surfaces. Or, all seven of the heads may be mounted on the same unit and operated with the same reference surface. To keep the data tracks separate for each separate position of the reference track, the data heads may be closely packed together so as to provide the desired seven data tracks between each adjacent pair of reference tracks, or for each position of the reference track each one of the data heads may occupy a separate position which is interleaved with the others and which is distinct from the positions of the other data heads. The illustration of four data heads for each of the data transducer units 50–54 will therefore be understood merely to be illustrative of one possible alternative.

Figure 4:
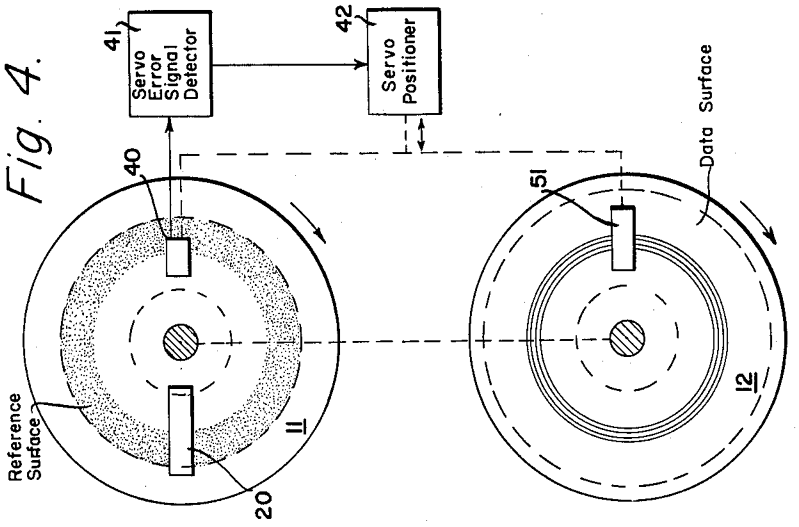
FIG. 4 is a simplified representation of a portion of the random access memory of FIG. 1, showing various elements of the arrangement of FIG. 1 in a different spatial relation for clarity.

The operation of a device in accordance with the present invention may best be envisioned by reference to both FIG. 1 and FIG. 4. In FIG. 4 a part of the data storage device 10 of FIG. 1 is shown in a simplified view in which the reference surface of the top disc 11 and one of the data surfaces of the next disc 12 are placed side by side, instead of being in their normally axially aligned positions.

The system operates by laying down and using a new reference track for each address which is to be employed. In operation, the discs 11, 12 and 13 of the storage device 10 are rotated at an extremely high rate of speed, and data is reproduced from and recorded on the data recording surfaces. When the data transducer units 50–54 are to be operated at a new address, the address register 16 operates the switching matrix 17 so as to energize a single one of the auxiliary conductors in the reference transducer unit 20. As explained above in conjunction with FIGS. 2 and 3, a signal on a selected one of the input conductors into the reference transducer unit 20 electrically divides the reference transducers 21–27 into two radially separate groupings. Opposite magnetizations are induced in the transducers in each one of the groupings.

Thus, on either side of the selected dividing line determined by the energized auxiliary conductor, the reference transducers cause the associated reference surface to be magnetized with opposite polarities in radially distinct zones. The transition zone or reference track, established by the adjacent boundaries of the two opposite zones of magnetization is placed at one of a number of discrete radial positions relative to the reference surface, as determined by the energized auxiliary conductor.

The circumferential zones of opposite magnetization are most clearly illustrated in the displaced elements shown in the view of FIG. 4, in which the outer radial zone is further defined by use of a stippled hatching. The manner in which the servo transducer 40 follows the reference line may also best be visualized with reference to FIG. 4. When occupying a position which is an intermediate radial position with respect to one of the two zones of magnetization, the servo transducer 40 provides a steady state signal of a polarity which is dependent upon the magnetization of the then unassociated zone. Upon being brought into the transition zone, in the region which defines the reference track, the servo transducer 40 provides a signal which is of lesser amplitude but which still represents in polarity the sense of the deviation of the servo transducer 40 from the precise reference line. Accordingly, for any specific position of the reference track, the servo loop including the servo positioner 42 moves the arm assembly 45 so that after the relatively short interval needed for positioning the reference transducer 40 is located substantially directly on the reference track. Any material departure of the reference transducer 40 from the location of the reference track results in generation of an error signal and a resultant corrective movement by the servo system.

Because the data transducer units 50–54 are mechanically ganged to move with the servo transducer 40 by the arm assembly 45, the data transducer units 50–54 likewise move to positions which are dependent upon the radius at which the reference track is located. Following the positioning period, therefore, the data heads, such as the heads 57 and 58 on the first two data transducer units 50 and 51 may operate with the associated data read-write circuitry 60 to transfer information between the data surfaces and an associated data processor (not shown).

When it is desired to position the data transducer units 50–54 at a new address, the above sequence is repeated, while erasing the old reference track which was previously used. For example, a change in the desired address causes energization of a different one of the auxiliary conductors 31–36 in the reference transducer device 20 of FIGS. 2 and 3, thus resulting in a change in the magnetization pattern on the reference surface, with a new reference pattern being established. As the new reference pattern is laid down, the servo transducer 40 and the associated servo system elements cause the servo transducer 40 to seek and follow the reference track. In doing so, the arm assembly 45 moves the data transducers 50–54 which are ganged with the servo transducer 40 into a corresponding position.

It will be appreciated that the precision with which this system may operate is due in large measure to two significant factors. First, the pattern which is laid down is varied electrically but is established by the operation of mechanically fixed elements. The electrical selection which is made consists only of the selection of one out of a number of lines, and therefore may be provided simply and at high speed. At the same time, the reference transducer unit 20 may be constructed and placed with any precision desired.

This means that the shape and spacing of the magnetic gap elements in the reference transducer unit 20 will in each instance provide a precisely located and reliably established reference track. The second factor which contributes to the superior operation results from the nature of the reference pattern which is recorded. With zones of opposite magnetization, the servo transducer 40 operates with patterns which may be considered to be inherently stable. Because the zones on either side of the transition zone are oppositely magnetized, the reference pattern in effect provides a positive control of the generation of error signals.

The term "zones of magnetization" does not mean that all portions of a zone need to be uniformly magnetized in a given direction. Instead, the reference transducers may magnetize tracks, and the areas between the tracks may be magnetized at a lower level or even relatively unmagnetized. If this is the case, the servo transducer 40 is still in a region in which a control signal of a selected polarity is provided. If needed, the width of the servo transducer relative to the magnetization tracks can be made sufficient to span more than one of the tracks, so that a null condition is achieved only when the servo transducer derives equal signal contribution from the two zones having opposite magnetization.

An alternative arrangement which is particularly suitable for use where only a single recording disc is to be employed is shown in FIG. 5. In such an arrangement, a data storage device 70 may consist of a single disc 71 coupled to a rotatable shaft 72. One radial portion of the disc 71 may constitute the reference surface, so that the remaining portion constitutes the data recording surface. Here, the inner radial surface is utilized for the reference surface, and a transducer 20 is disposed in a fixed spatial relation to this portion of the disc 71. The reference transducers 20 are addressed by switching matrix 17 which is operated by an address register 16 in the manner described above with reference to the arrangements of FIGS. 1 and 4. A servo transducer 40 adjacent the reference surface and magnetically coupled thereto provides signals to an error signal detector 41 which operates with servo positioner 42 mechanically coupled to the servo transducer 40 to provide a complete servo loop, also in the manner of the arrangement of FIGS. 1 and 4.

In this instance, however, the arm assembly 75 coupled to the servo transducer 40 also supports a data transducer unit 76 which is associated with the outer radial portion of the disc 71. Thus, the data transducers 76 are associated with the data surface on the single disc 71 and cooperate with associated data read-write circuitry 77 to provide data transfer.

The arrangement shown in FIG. 5 has particular advantages where a simpler single disc random access memory is to be used. Note that in some installations the innermost radial portion of a disc will not be suitable for data recording in any event, because the circumferential packing density may vary too widely between the inner and outer radial areas of the disc.

An alternative arrangement of the invention is shown in FIG. 6 in which the reference transducers 20 are energized from a source of alternating current 80 in a manner similar to that described above in connection with FIG. 1. An address register and switching matrix may be employed in conjunction with the reference transducers 20 so that current is passed through selected ones of the transducers in a direction opposite to that in which current passes through the remainder of the transducers. Where a source of alternating current is employed, the alternating current wave may be applied to a selected one of the conductors 31–36 of FIG. 2 to produce a reference pattern on the surface of the disc 11 in a configuration similar to a checkerboard. Thus, a transducer 40 in the form of a conventional magnetic pickup head may be employed to generate an error signal for application to the servo positioner 42. Either by means of a separate timing track or by positioning a timing signal transducer 81 in a fixed location with respect to the reference pattern, an electrical signal may be derived for comparison with the signals derived from the servo transducer 40 in a synchronous demodulator 82. When the servo transducer 40 is positioned directly over the reference track, the alternately magnetized areas of the reference pattern produce magnetic fields which cancel so that a null is established with the synchronous demodulator 82 providing a substantially zero error signal to the servo positioner 42. In contrast, when the servo transducer 40 is on one side of the reference track an output signal is provided from the transducer 40 which is in phase with the signal from the timing signal transducer 81. The synchronous demodulator 82 then provides an output signal of a suitable polarity for application to the servo positioner 42 which in turn repositions the servo transducer 40 via a mechanical linkage illustrated diagrammatically in FIG. 6 by means of a dashed line 83. Where the servo transducer 40 is on the opposite side of the reference line from that described above, a signal is provided to the synchronous demodulator 82 which is out of phase with respect to the signal from the timing signal transducer 81 and a synchronous demodulator 82 provides an output signal of a suitable polarity for application to the servo positioner 42 for repositioning the servo transducer 40 over the reference track. Accordingly, the arrangement of FIG. 6 functions as a null balance servo system in which the servo transducer 40 is maintained in a position directly above the reference track established by the oppositely phased adjacent sectors of the reference pattern established by the reference transducers 20. In the same manner as that described above, data transducers may be mechanically linked to the servo transducer 40, positioning the data transducers with respect to addressed data tracks recorded on either a separate or the same disc which bears the reference pattern.

Another alternative arrangement which may be employed to produce a reference pattern similar to that shown in FIG. 6 may include a recording disc having a plurality of radial non-magnetic strips imbedded in the surface thereof in positions resembling the spokes of a wheel. Where such a disc is employed in the arrangement of FIG. 6, the reference transducers 20 may receive direct current which is passed through selected ones of the transducers in the manner shown and described in FIG. 1. Between each pair of radial non-magnetic strips, the reference transducers produce areas of opposite magnetization separated by a reference track. The presence of the non-magnetic strips enables a conventional magnetic recording head to be employed as a servo transducer since the magnetic fields applied to the servo transducer fluctuate as the surface of the disc passes beneath the servo transducer. Hence, the alternating current servo system of FIG. 6 may be employed to achieve a positional control of the servo transducer while the reference transducer receives direct energizing currents.

Although the present arrangement is particularly suitable for use with magnetic recording techniques, it will be noted that other arrangements might be used for defining and following an erasable reference track in accordance with the invention. If a reference track consisting of a thin magnetized line is laid down by one of a number of reference transducers, for example, a pair of servo transducers which are spaced apart may be utilized to provide signals whose relationship can be used to control the servo system. Or, an electrostatic recording and track following arrangement might be used instead of a magnetic system. If desired, instead of laying down a track at selected positions by one of the above techniques, elements imbedded in the recording surface may instead be energized and the energized elements detected by a follower mechanism. Thus, if a number of conductors are imbedded in circumferential paths around the reference surface, one of the conductors may be energized with a current and the magnetic fields generated therearound may be detected by a follower mechanism. It will also be recognized that instead of a disc the reference and recording areas may be provided by a drum having a magnetic or other recording surface.

While there have been described above and illustrated in the drawings various systems for precisely and rapidly positioning transducers in a random access memory through the use of an erasable pattern, it will be appreciated that the invention is not limited thereto. Accordingly, the invention should be treated as embodying all modifications, variations or equivalent arrangements falling within the scope of the annexed claims.

I claim:

1. A control system for positioning transducers at selected addresses in a recording surface form of memory, said system comprising a plurality of transducers, a having a reference portion, a reference recorder device disposed across substantially all said reference portion of said one recording surface, an erasable reference track, means coupled to said recorder device for operating the same to provide said erasable reference track; said track being differently positioned for each desired address, and said reference track dividing said reference portion into two oppositely recorded areas, and a servo system including one of said transducers responsive to either of the oppositely recorded areas for moving said one of the transducers in a first or in a second direction toward the reference track to control the positions of the other transducers relative to the remaining part of the available recording surface.

2. A random access memory system in which data transducers are moved to selected addresses relative to recording surfaces, including the combination of a recording device which moves cyclically about a selected axis and which includes a reference surface and at least one data surface for recording thereon, the reference surface and each data surface defining a recording area having a plurality of corresponding reference and recording track positions, a number of reference recorders disposed across the path of the moving reference surface and arranged to record thereon, each of the reference recorders being separately energizable, electrically operable address circuits selectively linking the reference recorders and energizing the recorders in two groups to define two different radially distinct recorded patterns across the entire reference surface area containing the reference tracks, each reference recorder in one group being energized in a first manner and each recorder in the other group being energized in an opposite manner, the adjacent boundaries of the different recorded patterns defining an intermediate reference track which corresponds to at least one of the recording tracks, a track follower device including a transducer adjacent the reference surface and movable relative thereto and generating a signal dependent upon the pattern recorded on the area to which it is adjacent, the follower device also including a control system for controlling the position of the transducer to maintain the transducer at the intermediate reference track, and at least one data transducer adjacent the data surface of the recording device and all mechanically coupled to and movable with the transducer to a corresponding track on the data surface as controlled by the address circuits.

3. A random access data storage system including a number of rotatable magnetic recording discs on a common central axis, one surface of one of the discs providing a positioning reference surface and the remainder being available for the storage of data, circuits providing address signals for data transfer operations, a reference track recorder positioned in proximate relation to the reference surface, the reference track recorder including a number of transducers at fixed radially separated points relative to the reference surface and also including means for operating the transducers on opposite sides of a selected reference track radius so as to provide opposite magnetization of the circumferential areas on the disc on the two sides of the selected radius, a servo controlled follower mechanism including a magnetic servo transducer movably positioned adjacent the reference surface and controlled by the servo mechanism in response to the magnetization of the adjacent reference surface to seek the reference track radius between the two oppositely magnetized circumferential areas, a number of data transfer transducer units, each unit being adjacent to and magnetically coupled to a different one of the data storage discs, all of the data transducer units being mechanically movable with the servo controlled follower mechanism to various radial points relative to the common axis as determined by the reference track, thereby to align the data transfer transducers with data tracks having fixed relations to the reference track, and circuits coupled to the data transfer transducers for providing data transfer operations therewith.

4. Positioning apparatus for controlling the addresses at which transducers gain access to a random access memory system, the apparatus including in combination a random access memory device including a number of disc members disposed about the same axis, the disc members coupling rotatable magnetic surfaced members and providing at least two magnetic surfaces for recording, one of the surfaces being a reference surface, the combination also including a serial row of magnetic transducers disposed in fixed positions along a radius adjacent the reference surface, a central conductor threading the serial row of magnetic transducers, a number of auxiliary conductors, each coupled to the central conductor and interposed between a different adjacent pair of the magnetic transducers and extending separately therefrom, an addressing circuit for the serial row of transducers, the addressing circuit being selectively coupled to any individual one of the auxiliary conductors, so that a serial group of the transducers may be linked in a magnetic circuit by the center conductor and an energized auxiliary conductor, thus energizing the magnetic transducers in two different groups so that circumferential areas of the reference surface on opposite sides of the energized auxiliary conductor are differently magnetized, the circumferential line dividing the differently magnetized areas providing a position reference line, a servo transducer mounted adjacent the reference surface and movable radially relative to the circumferential patterns thereon for providing signals indicative of the displacement of the servo transducer from the reference line, a servo system responsive to the signals generated by the servo transducer and mechanically coupled to the servo transducer for positioning the transducer substantially on the reference line, and a group of data transducers mechanically ganged with the servo transducer and movable therewith to selected radial addresses of other recording surfaces on the disc members.

5. Apparatus for positioning data transducers at selected addresses in a random access disc memory system, including in combination magnetic rotatable disc members disposed along a given axis and providing a number of recording surfaces, one of the surfaces being a reference surface, a group of serially arranged reference transducers radially disposed adjacent the reference surface, an address selection circuit for energizing all of the reference transducers in two continuous series, so that the entire reference surface is divided into two adjacent circumferential areas that are differently magnetized, the line dividing the two differently magnetized areas defining a position reference line at a selected radius relative to the axis, a servo system including a servo transducer movable radially relative to the circumferential areas of different magnetization on the reference surface for following the position reference line, and a number of data transducers, each associated with areas of the recording surfaces other than the reference surface, the data transducers being mechanically coupled to and movable with the servo transducer to be positioned thereby at selected corresponding addresses on the recording surfaces.

References Cited in the file of this patent

UNITED STATES PATENTS

| | | |
|---|---|---|
| 2,590,091 | Devol | Mar. 25, 1952 |
| 2,679,620 | Berry | May 25, 1954 |
| 2,700,703 | Nordyke | Dec. 20, 1955 |
| 2,733,425 | Williams | Jan. 31, 1956 |
| 2,835,743 | Muffley | May 20, 1958 |
| 2,915,597 | Wanlass | Dec. 1, 1959 |
| 3,007,144 | Hagopian | Oct. 31, 1961 |
| 3,023,404 | Dickerson | Feb. 27, 1962 |
| 3,034,111 | Hoagland et al. | May 8, 1962 |

UNITED STATES PATENT OFFICE

CERTIFICATE OF CORRECTION

Patent No. 3,156,906 November 10, 1964

Richard E. Cummins

It is hereby certified that error appears in the above numbered patent requiring correction and that the said Letters Patent should read as corrected below.

Column 9, after line 14, insert -- plurality of recording surfaces, one recording surface --.

Signed and sealed this 4th day of May 1965.

(SEAL)
Attest:

ERNEST W. SWIDER
Attesting Officer

EDWARD J. BRENNER
Commissioner of Patents